United States Patent
Dong et al.

(10) Patent No.: US 10,474,489 B2
(45) Date of Patent: Nov. 12, 2019

(54) TECHNIQUES TO RUN ONE OR MORE CONTAINERS ON A VIRTUAL MACHINE

(71) Applicant: Intel Corporation, Santa Clara, CA (US)

(72) Inventors: Yao Zu Dong, Shanghai (CN); Kun Tian, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 133 days.

(21) Appl. No.: 15/576,974

(22) PCT Filed: Jun. 26, 2015

(86) PCT No.: PCT/CN2015/000464
§ 371 (c)(1),
(2) Date: Nov. 27, 2017

(87) PCT Pub. No.: WO2016/205977
PCT Pub. Date: Dec. 29, 2016

(65) Prior Publication Data
US 2018/0157517 A1    Jun. 7, 2018

(51) Int. Cl.
*G06F 9/455*    (2018.01)
*G06F 9/50*    (2006.01)

(52) U.S. Cl.
CPC ........ *G06F 9/45558* (2013.01); *G06F 9/5077* (2013.01); *G06F 2009/4557* (2013.01); *G06F 2009/45562* (2013.01); *G06F 2009/45583* (2013.01); *G06F 2009/45595* (2013.01)

(58) Field of Classification Search
CPC ............ G06F 9/45558; G06F 9/45562; G06F 9/4557; G06F 9/45575
See application file for complete search history.

(56) References Cited

U.S. PATENT DOCUMENTS

| 8,756,598 B1 * | 6/2014 | Costea ................ G06F 9/45558 717/174 |
| 2005/0114607 A1 | 5/2005 | Cohen |
| 2010/0122248 A1 * | 5/2010 | Robinson ................ G06F 9/485 718/1 |
| 2011/0087822 A1 | 4/2011 | Bennett et al. |
| 2012/0066469 A1 | 3/2012 | Yochai et al. |

(Continued)

OTHER PUBLICATIONS

International Search Report and Written Opinion received for PCT Patent Application No. PCT/CN2015/000464, dated Mar. 24, 2016, 12 pages.

(Continued)

*Primary Examiner* — Philip Wang

(57) ABSTRACT

Examples may include techniques to run one or more containers on a virtual machine (VM). Examples include cloning a first VM to result in a second VM. The cloned first VM may run at least a set of containers capable of separately executing one or more applications. In some examples, some cloned containers are stopped at either the first or second VMs to allow for at least some resources provisioned to support the first or second VMs to be reused or recycled at a hosting node. In other examples, the second VM is migrated from the hosting node to a destination hosting node to further enable resources to be reused or recycled at the hosting node.

25 Claims, 9 Drawing Sheets

(56) References Cited

U.S. PATENT DOCUMENTS

| | | | |
|---|---|---|---|
| 2016/0098285 A1* | 4/2016 | Davis | G06F 9/45545 718/1 |
| 2017/0300394 A1* | 10/2017 | Raut | G06F 11/203 |
| 2017/0353433 A1* | 12/2017 | Antony | H04L 49/70 |
| 2017/0371693 A1* | 12/2017 | Corrie | G06F 9/45558 |
| 2018/0006936 A1* | 1/2018 | Lu | H04L 45/74 |
| 2018/0143885 A1* | 5/2018 | Dong | G06F 11/1482 |
| 2018/0246751 A1* | 8/2018 | Dong | G06F 9/48 |

OTHER PUBLICATIONS

Hines et al. "Post-Copy Based Live Virtual Machine Migration using Adaptive Pre-Paging and Dynamic Self-Ballooning", VEE09: Proceedings of the 2009 ACM Sigplan/Sigops International Conference on Virtual Execution Environments; Washington, DC, USA; Mar. 11-13, ACM Press, US, Mar. 11, 2009, pp. 51-60 * abstract* * p. 51, paragraph 1.-p. 56, paragraph 5. *

Dua Rajdeep et al: "Virtualization vs Containerization to Support PaaS", 2014 IEE International Conference on Cloud Engineering, IEEE, Mar. 11, 2014, pp. 610-614 * abstract* * p. 610, left-hand column, paragraph I.-p. 612, left-hand column, paragraph V.

European Search Report for the European Patent Application No. 15895877, dated Feb. 14, 2019, 2 pages.

* cited by examiner

700

CLONE A FIRST VM ARRANGED TO RUN AT LEAST ONE SET OF CONTAINERS THAT INCLUDES A FIRST CONTAINER AND A SECOND CONTAINER THAT ARE SEPARATELY CAPABLE OF EXECUTING RESPECTIVE FIRST AND SECOND APPLICATIONS, THE CLONING TO RESULT IN A SECOND VM ARRANGED TO AT LEAST TEMPORARILY RUN THE FIRST AND SECOND CONTAINERS CONCURRENT WITH THE FIRST AND SECOND CONTAINERS ARRANGED TO RUN AT THE FIRST VM
702

SWITCH A NETWORK CONNECTION FOR THE SECOND CONTAINER ARRANGED TO RUN AT THE FIRST VM TO CAUSE INPUT/OUTPUT PACKETS ASSOCIATED WITH THE SECOND CONTAINER CAPABLE OF EXECUTING THE SECOND APPLICATION TO BE RE-ROUTED FROM THE FIRST VM TO THE SECOND VM
704

DROP OUTPUT PACKETS GENERATED BY THE SECOND APPLICATION EXECUTED BY THE SECOND CONTAINER ARRANGED TO RUN AT THE FIRST VM FOLLOWING THE SWITCH OF THE NETWORK CONNECTION
706

DROP OUTPUT PACKETS GENERATED BY THE FIRST APPLICATION EXECUTED BY THE FIRST CONTAINER ARRANGED TO RUN AT THE SECOND VM
708

*FIG. 7*

Storage Medium *800*

Computer Executable
Instructions for 700

*FIG. 8*

TECHNIQUES TO RUN ONE OR MORE CONTAINERS ON A VIRTUAL MACHINE

CROSS-REFERENCE TO RELATED APPLICATIONS

This application is a national phase claiming the benefit of and priority to International Patent Application No. PCT/CN2015/000464, entitled "TECHNIQUES TO RUN ONE OR MORE CONTAINERS ON A VIRTUAL MACHINE", filed Jun. 26, 2015, which is hereby incorporated by reference in its entirety.

TECHNICAL FIELD

Examples described herein are generally related to virtual machines (VMs) capable of running one or more containers.

BACKGROUND

System virtualization for a data center may include nodes or servers of the data center being configured to host virtual machines (VMs). VMs, in relation to each other, may provide strong, isolated execution environments for executing applications associated with providing network services. Each VM may run an operating system (OS) for different clients that may be securely isolated from other VMs. Also, each VM may have its own OS kernel in addition to an application execution environment.

OS virtualization implementations often referred to as "container" such as Linux Containers (LXC) or Docker may provide multiple execution environments for applications with a somewhat lessened isolation as compared to VM execution environments. A container may maintain some isolation via separate namespace for process identifiers (PIDs), interprocess communication (IPC), storage, etc. Also, with the use of multiple containers, a memory footprint used for a new execution environment may be reduced compared to separate VM execution environments as an OS kernel may be reused for multiple containers.

BRIEF DESCRIPTION OF THE DRAWINGS

FIG. 7 illustrates an example of a logic flow.
FIG. 8 illustrates an example of a storage medium.

DETAILED DESCRIPTION

As contemplated in the present disclosure, use of containers may provide multiple execution environments for applications with a somewhat lessened isolation as compared to VM execution environments. But containers may allow for higher density deployments in a data center (e.g., more execution environments using less host resources) and may have relatively fast provision speed when being initialized for executing applications as compared to VMs. A typical usage in today's data center may be to co-host at least a set of containers on a VM reusing both VM and container technologies together for flexibility. For example, large data center operators such as Google® may use Linux+Container+Kernel-based VM (KVM) to host both a VM and a container together in one node or server, for different usage. Different usage may include running a set of containers inside a VM.

In a co-host operating environment that includes running a set of containers inside a VM, new operating requirements or characteristics may be requested that may strengthen and/or relax security/isolation. For example, a change of business direction for a client and/or a temporal business case requirement may require more or stronger isolation. A requirement for more or stronger isolation may result in running co-hosted containers in separate VMs. A reverse situation may occur when operating characteristics have two containers running in separate VMs. For this reverse situation, a request may be made to relax the operating characteristic of high isolation so that two containers can be co-hosted by a same VM thus having an operating characteristic of lower isolation/higher density. As a result of the higher density operating characteristic, less node/server resources may be used.

A typical solution used to change operating characteristics between high isolation and high density is to use container migration technology together with VM duplication. As part of this solution, splitting two co-hosted containers into two separate VMs for improved isolation/security to first create the second VM, boot the second VM, prepare the containers to be split and/or its manager/hypervisor, and finally migrate an operating state of at least one of the containers to be split from a source container in the co-hosted environment to a target container running at the second VM. Unlike a typical live VM migration, a container migration may use a pre-memory copy phase to migrate its entire state from source to target container and thus can directly resume at the target container running at the second VM. However, this container migration process typically requires a boot of the second VM to start the target container's manager/hypervisor and this boot may take a relatively long or unacceptable time (e.g., usually 10-30 seconds). It is with respect to these challenges that the examples described herein are needed.

Figure 1:
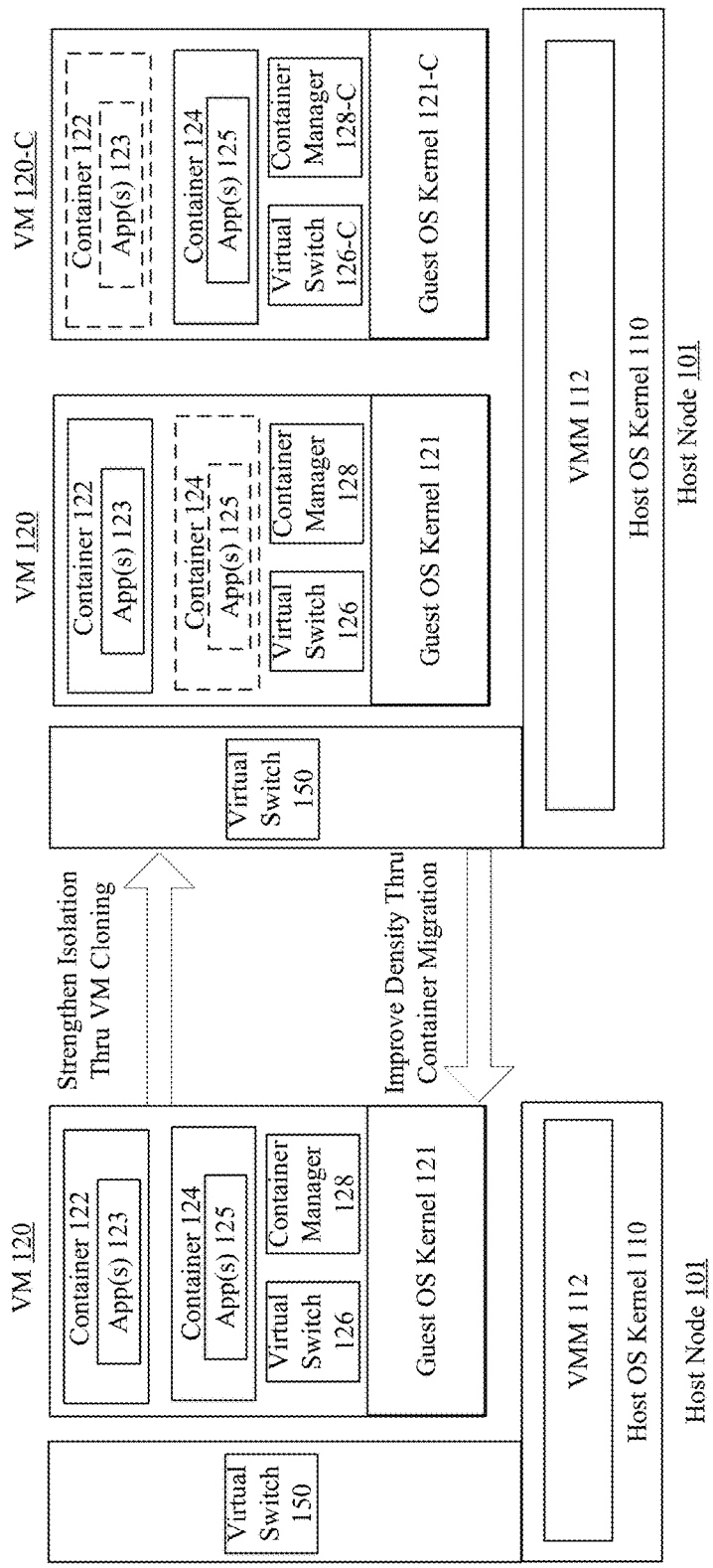
FIG. 1 illustrates an example first system.

FIG. 1 illustrates an example system 100. In some examples, as shown in FIG. 1, system 100 includes a host node 101. Host node 101 may be node or server capable of hosting a plurality of virtual machines (VMs) such as VM 120. Hosting may include providing composed physical resources (not shown) such as processors, memory, storage or network resources maintained at or accessible to host node 101. Also, in some examples, host node 101 may be a node/server in a data center having a plurality of interconnected nodes/servers that may be arranged to provide Infrastructure as a Service (IaaS), Platform as a Service (PaaS) or Software as a Service (SaaS) services for one or more clients or consumers of these types of cloud-based services.

In some examples, as shown in FIG. 1, host node 101 may have a host operating system (OS) kernel 110. Host OS kernel 110 may be arranged to implement a virtual machine manager (VMM 112). VMM 112 may be configured to operate as a KVM or hypervisor (so-called type-2 model) to manage various operations and/or configurations for VMs hosted by host node 101. Or in another embodiment the VMM 112 may be implemented below host OS kernel 110 (so-called type-1 model), which is not shown in this figure but this whole concept may still be applied and may be applicable to this disclosure. Also, as shown in FIG. 1, Guest OS kernel 121 may support an executing environment for a single VM 120. For these examples, VM 120 may be arranged to run at least one set of containers that includes container 122 and container 124. Container 122 may be capable of executing one or more applications (App(s)) 123 and container 124 may be capable of executing one or more App(s) 125.

According to some examples, host node 101 may also provision resources (e.g., network resources such as network input/output devices, memory, network ports, etc.) to support a virtual switch 150 capable of routing input/output packets to individual VMs and/or containers. For these examples, virtual switch 150 may route network connections through virtual switch 126 at VM 120 to enable containers 122 and 124 to receive or transmit packets associated with executing respective App(s) 123 and 125. VM 120 may also include a container manager 128 to facilitate management or control of containers 122 or 124.

In some examples, as described more below, logic and/or features of host node 101 may (e.g., VMM 112) receive a request to change an operating characteristic for at least one of containers 122 or 124 to cause the these containers to become isolated from each other (e.g., for increased security). The isolation of these containers may be accomplished by the logic and/or features of host node 101 cloning VM 120 to result in a second VM shown in FIG. 1 as VM 120-C. VM 120-C may be a separate instance of VM 120. VM 120-C, following cloning, may be arranged to at least temporarily run both containers 122 and 124 concurrent with VM 120 running containers 122 and 124. For these examples, as shown in FIG. 1, VM 120-C may also include a guest OS kernel 121-C, a virtual switch 126-C and a container manager 128-C to support the execution environment for containers 122 and 124.

According to some examples, isolation of the containers may include logic and/or features of host node 101 (e.g., virtual switch 150) switching a network connection for container 124. The switching of the network connection for container 124 may cause input/output packets associated with container 124 executing App(s) 125 to be re-routed from going through virtual switch 126 at VM 120 to now go through virtual switch 126-C at VM 120-C to reach container 124 executing App(s) 125 and running at VM 120-C. However, no network connection is routed to container 122 executing App(s) 123 and running at VM 120-C. Further, to complete the isolation of the container 124 from container 122 at VM 120, logic and/or features of host node 101 such as virtual switch 126 may drop output packets generated by App(s) 125 executed by container 124 following the switching of the network connection for container 124. Also, to complete the isolation of container 122 from container 124 at VM 120-D, virtual switch 126-C may drop output packets generated by App(s) 123 executed by container 122. Since no packets are being routed to container 124 running at VM 120 and container 122 running at VM 120-C and all output packets are dropped from these containers, they may be referred to as "zombie" containers. Also, in some examples, container managers 128 and 128-C may communicate with each other to indicate which containers hosted by which VMs are zombie containers to help facilitate this splitting process. Alternatively, logic and/or features of VMM 112 may be capable of relaying information between the containers managers 128 and 128-C to indicate which containers are zombie containers at respective VMs.

Also, as described more below, logic and/or features of host node 101 (e.g., VMM 122) may implement a copy-on-write (COW) mechanism to cause VM 120-C to initially share the same memory pages as VM 120 to further reduce the provisioning time while eventually using different allocated memory for running container 124 in VM 120-C from originally allocated memory provisioned to run container 122 in VM 120. The COW mechanism may be implemented responsive to execution of App(s) 125 by container 124 at VM 120-C leading to a modification of or an attempt to write to cloned memory pages.

In some examples, both VM 120 and 120-C may continue to concurrently run containers 122 and 124. The concurrent running of these containers may enable host node 101 to quickly transition from a high isolation operating characteristic to a higher density operating characteristic. For these examples, responsive to a receiving a request for the higher density and less isolation, VMM 112 may cause container 124 to be migrated back to VM 120 using typical container migration techniques. VMM 112 may then shutdown VM 120-C.

According to some examples, rather than continue to run zombie container 124 at VM 120 and zombie container 122 at VM 120-C, respective container managers 128 and 128-C may stop all execution threads for these zombie containers. As described more below, memory allocated to these stopped containers may be recycled or allocations removed to free up memory for other uses by host node 101. The other uses may include allocating memory to other VMs, other containers and/or other virtual elements such as virtual switch 150.

Figure 2:
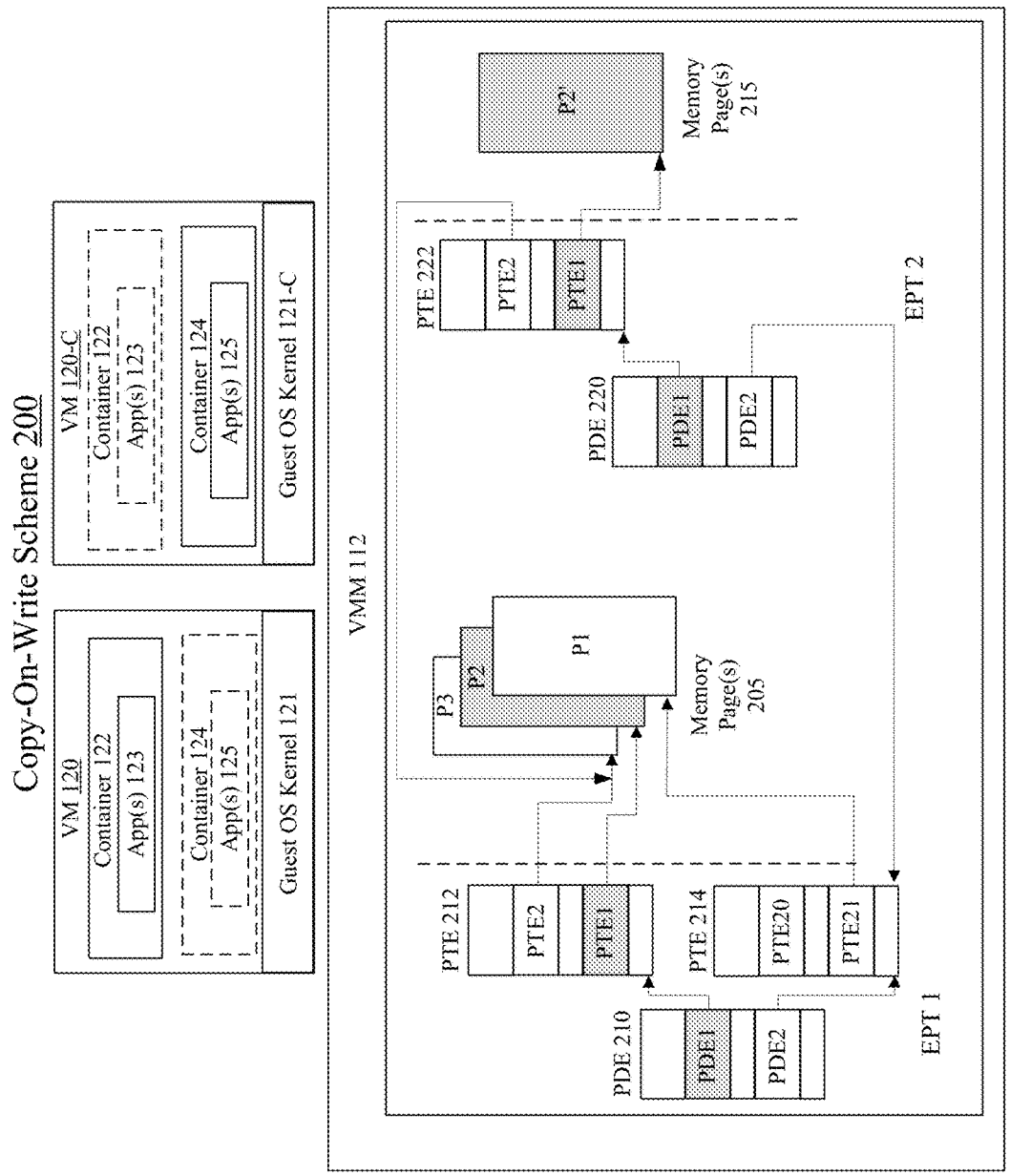
FIG. 2 illustrates an example copy-on-write scheme.

FIG. 2 illustrates an example copy-on-write (COW) scheme 200. In some examples, COW scheme 200 may be executed by logic and/or features of host node 101 such as VMM 112 to cause VM 120-C to use different allocated memory for running container 124. For these examples, COW scheme 200 may include largely saving a memory footprint or memory allocated at an initial time that VMs 120 and 120-C concurrently run containers 122 and 124. In other words, the memory footprint or memory allocations are cloned for memory (e.g., memory pages) originally allocated or provisioned to VM 120 for running containers 122 and 124. Then, responsive to containers 122 or 124 running at VM 120-C writing to or attempting to modify one or more cloned memory pages, VMM 112 may cause these containers to use different memory than the originally allocated memory to VM 120. Also, responsive to containers 122 or 124 running at VM 120 writing to or attempting to modify one or more cloned memory pages, VMM 112 may cause these containers to use different memory as well.

In some examples, COW scheme 200 may include use of a multi-level page table such as an extended page table (EPT). To simplify a description of use of a multi-level page table, a two-level page table is used as the example for COW scheme 200 shown in FIG. 2. A two-level page table for EPT 1 may include page directory entry (PDE) table 210 and page table entry (PTE) tables 212 and 214. EPT 1, VM 120 and 120-C may initially share memory page(s) 205 including P1, P2 and P3. These memory pages may make use of EPT 1 for memory addressing. VMM 112 may modify EPT 1 to set all memory included in memory page(s) 205 to read only. When applications executed by containers running at VMs 120 or 120-C attempt to write to memory page(s) 205 such as P2, then VMM 112 may duplicate data contents of memory page P2 to memory page P2'. P2' may be part of one or more different allocated memory page(s) 215 for use by VM 120 or 120-C to run containers 122 and/or 124. VMM 112 may create EPT 2 that includes PDE table 220 and PTE table 222 for memory address mapping to memory page(s) 215.

Figure 3:
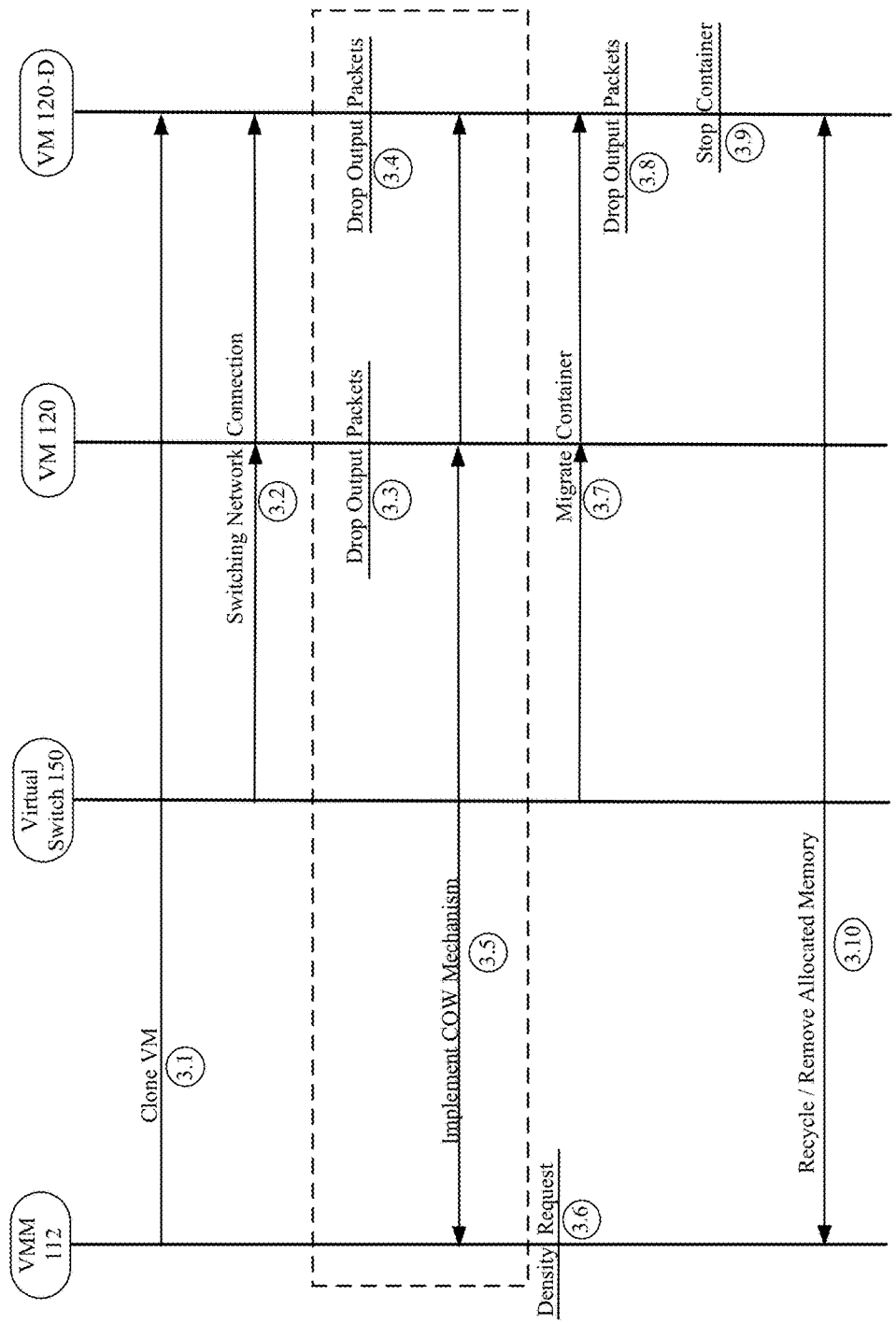
FIG. 3 illustrates an example first process.

FIG. 3 illustrates an example process 300. In some examples, process 300 may be for cloning a VM running containers in order to isolate an execution environment for one or more containers. For these examples, elements of system 100 as shown in FIG. 1 such as host node 101, VMM 112, virtual switch 150, VM 120 or VM 120-C may be related to process 300. Also COW scheme 200 as shown in FIG. 2 may also be related to process 300. However, example process 300 is not limited to implementations using elements of system 100 or COW scheme 200 shown in FIGS. 1-2.

Beginning at process 3.1 (Clone VM), logic and/or features of host node 101 such as VMM 112 may clone VM 120 to create VM 120-C as a separate instance of VM 120. VM 120-C may be arranged to at least temporarily run containers 122 and 124 concurrently with VM 120 running these containers. In some examples, VM 120 and 120-C may be stopped at least temporarily within the clone process. As described more below, when a COW mechanism is implemented, the clone process may also include cloning all EPT paging structures to make VM120-C at least temporarily share the same allocated system memory with VM120.

Moving to process 3.2 (Switching Network Connection), logic and/or features of host node 101 such as virtual switch 150 may switch a network connection for container 124 running at VM 120 to cause input/output packets associated with container 124 executing App(s) 125 to be re-routed from VM 120 to VM 120-C. After the routing information is changed, VMM 112 may cause VM 120 and 120-C to resume running of co-hosted containers 122 and 124.

Moving to process 3.3 (Drop Output Packets), logic and/or features provisioned to VM 120 such as virtual switch 126 may drop output packets generated by App(s) 125 executed by container 124 running at VM 120 following the switch of the network connection to VM 120-C. Since no input/output packets are being routed to or from VM 120 for container 124, in some examples, container 124 may be deemed a zombie container while in this type of operating state at VM 120.

Moving to process 3.4 (Drop Output Packets), logic and/or features provisioned to VM 120-C such as virtual switch 126-C may drop output packets generated by App(s) 123 executed by container 122 running at VM 120-C. Since no input/output packets are being routed to VM 120-C for container 122, in some examples, container 122 may also be deemed a zombie container while in this type of operating state at VM 120-C.

Moving to process 3.5 (Implement COW Mechanism), logic and/or features of host node 101 such as VMM 112 may implement a COW mechanism similar to COW scheme 200. In some examples, VMM 112 may cause VM 120-C to use different allocated memory for running container 124 responsive to App(s) 125 executed by container 124 writing to one or more cloned memory pages. VMM 112 may also cause VM 120 to use different allocated memory for running container 122 responsive to App(s) 123 executed by container 122 writing to the one or more cloned memory pages. Zombie container 122 at VM 120-C and zombie container 124 at VM 120 may also attempt to write to the cloned memory pages until all input packets received following the switching of the network connection for container 124 have been processed. The COW mechanism may or may not be used for these writes by these zombie containers. In some examples, as represented by a dashed-line box around processes 3.3-3.5, the various actions described by logic and/or features at VM 120, VM 120-C or host node 101 may occur in parallel.

Moving to process 3.6 (Density Request), logic and/or features of host node 101 such as VMM 122 may receive a request to again change the operating characteristic of containers 122 and 124 to be one of a higher density operating characteristic. In some examples, the higher density operating characteristic may cause the isolation of the containers to be ended.

Moving to process 3.7 (Migrate Container), logic and/or features of host node 101 such as VMM 112 or container managers 128 and 128-C of respective VMs 120 and 120-C may cause container 124 running at VM 120-C to be migrated back to VM 120. For these examples, the migration back to VM 120 may be responsive to request for increased density of containers to be run per VM at host node 101. Typical container migration techniques may be used to include live migration techniques that may enable App(s) 125 to be executed by container 124 in an uninterrupted manner during a live migration of container 124 back to VM 120.

Moving to process 3.8 (Drop Output Packets), logic and/or features provisioned to VM 120-C such as virtual switch 126-C may drop output packets generated by both App(s) 123 and 125 executing at container 122 (if any) and container 124.

Moving to process 3.9 (Stop Containers), logic and/or features provisioned to VM 120-C such as container manager 128-C may then stop all execution threads for App(s) 123 and 125 that may result in effectively stopping containers 122 and 124 from running at VM 120-C.

Moving to process 3.10 (Recycle/Remove Allocated Memory), logic and/or features of host node 101 such as VM 112 may then recycle or remove memory that was allocated to containers 122 and 124 running at VM 120-C. The process then comes to an end.

Figure 4:
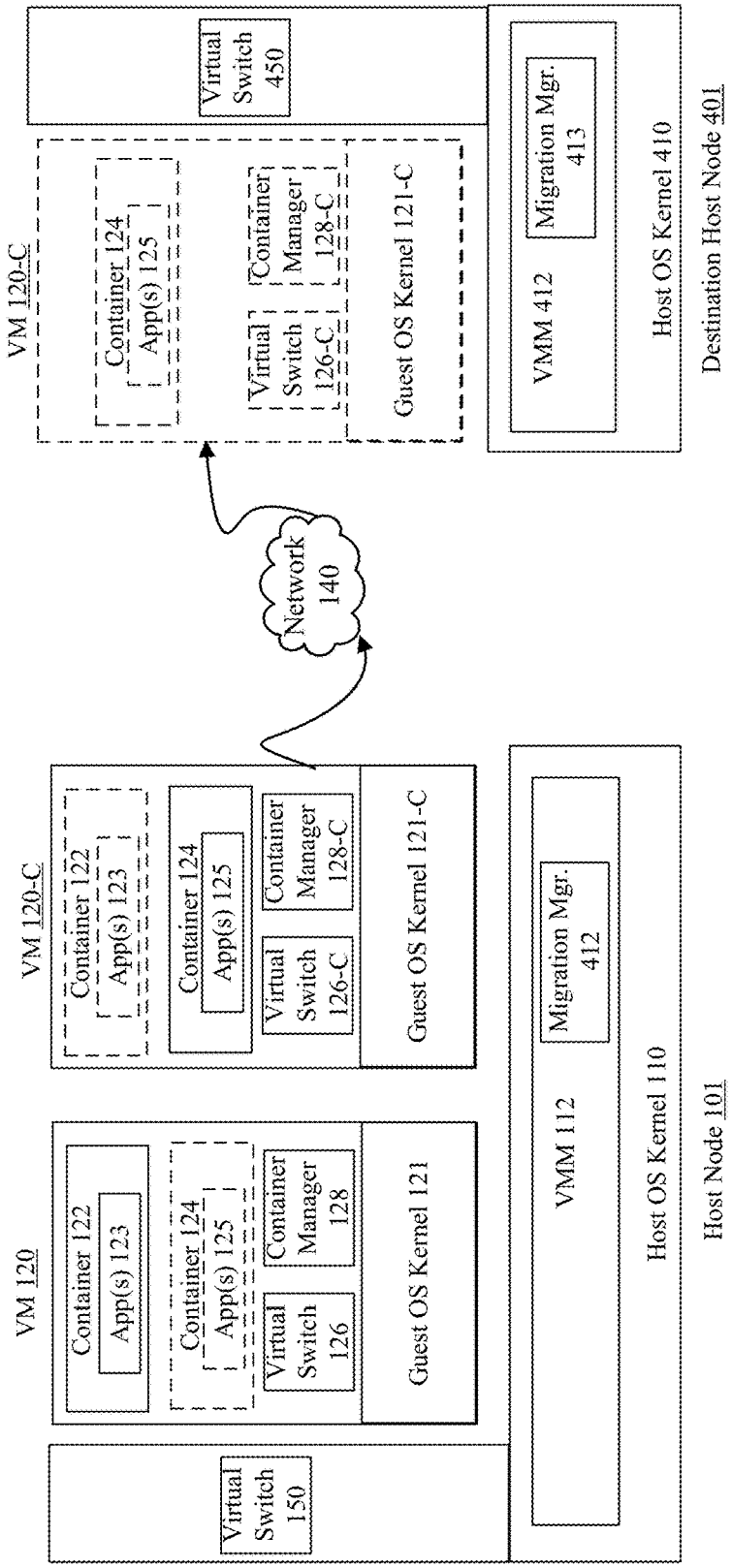
FIG. 4 illustrates an example second system.

FIG. 4 illustrates an example system 400. In some examples, as shown in FIG. 4, system 400 may include host node 101 coupled through a network 140 with a destination host node 401. For these examples, network 140 may be part of an internal network that communicatively couples host node 101 with various other host nodes that includes destination host node 401. These interconnected host nodes may be part of a data center providing network services to one or more clients or customers.

According to some examples, a cloning of VM 120 may occur that results in VM 120-D running container 124 executing App(s) 125 and VM 120 running container 122 executing App(s) 123 as mentioned above for FIGS. 1-3. As described more below, this cloning of VM 120 may be part of a fine-grained workload balancing process that also includes migrating VM 120-C to destination host node 401. For these examples, zombie containers 124 and 122 at respective VMs 120 and 120-C may be shut down and followed by the migration of VM 120-C to destination host node 401 to free up memory and/or other provisioned resources (e.g., processing, network, storage, etc.). The freed up memory and/or other provisioned resources may include those resource that were once used to support container 124 executing App(s) 125 while running at VM 120.

In some examples, logic and/or features of VMM 112 at host node 101 and VMM 412 at destination host node 401 such as migration manager 412 and migration manager 413 may facilitate migration of VM 120-C from host node 101 to destination host node 401. Resources at destination node 401 may then be provisioned to support VM 120-C such as virtual switch 450 as well as memory, processing or storage resources possibly used by VM 120-C while running container 124 that executes App(s) 125. For these examples, the migration of VM 120-C running container 124 may be responsive to a need to expose App(s) 125 to a larger pool of provisioned resources to process input/output packets. In other examples, the migration of VM 120-C may be responsive to a need for container 122 executing App(s) 123 while running at VM 120 to have more resources available due to the migration of VM 120-C that removed resource demands once placed on host node 101 by container 124 executing App(s) 125.

Figure 5:
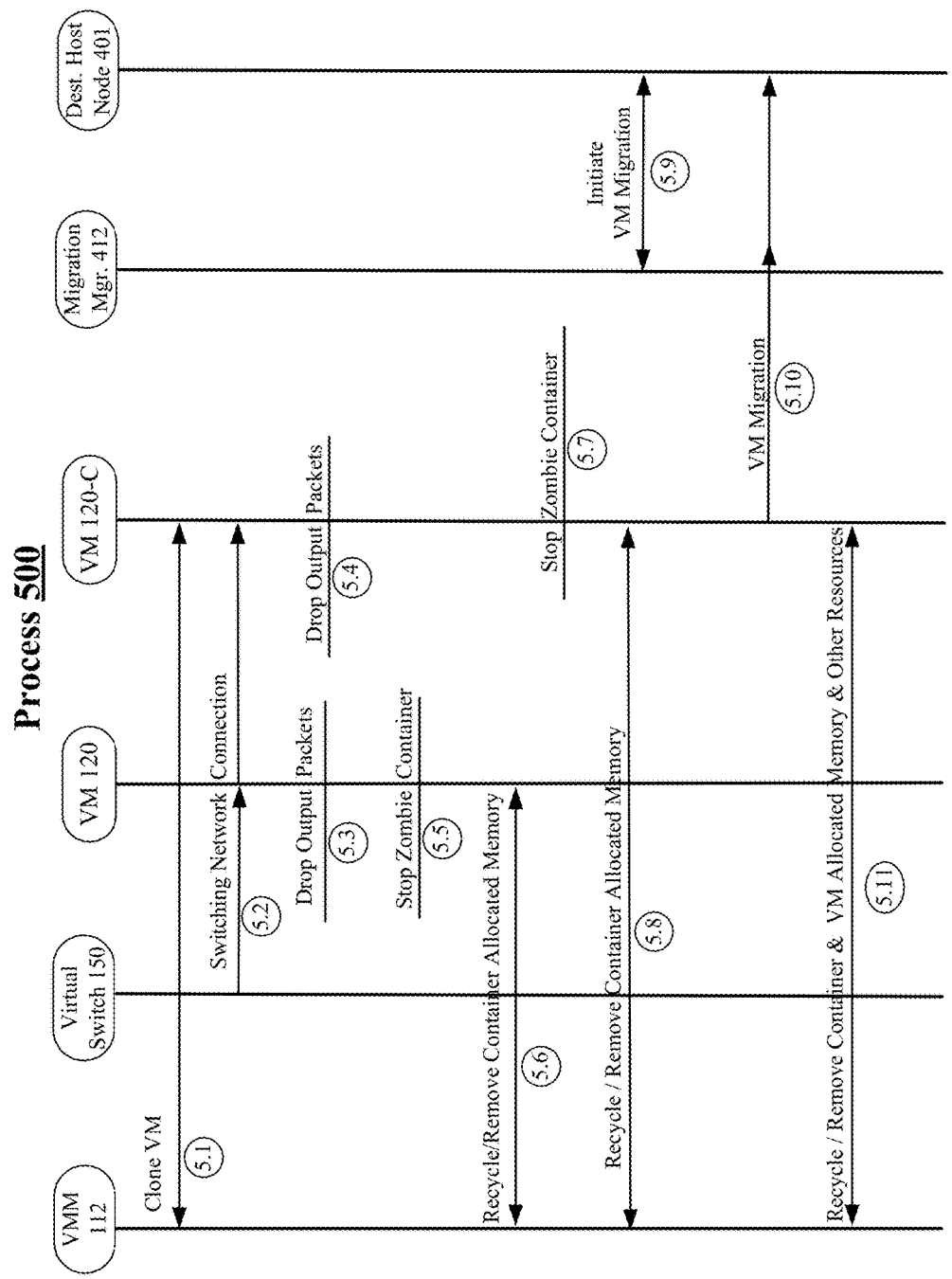
FIG. 5 illustrates an example second process.

FIG. 5 illustrates an example process 500. In some examples, process 500 may be for cloning a VM running containers in order to isolate an execution environment for one or more containers and also to migrate a VM running an isolated container to a destination host node for workload rebalancing. This way has the potential to reduce the footprint of VM live migration, e.g. when allocated network bandwidth is insufficient to migrate co-host VM120 with expected service shutdown requirement. In such case, split co-host containers may meet the strict network bandwidth requirement. For these examples, elements of systems 100 or 400 as shown in FIGS. 1 and 4 such as host node 101, destination host node 401, virtual switch 150, VM 120, VM 120-C or migration manager 412 may be related to process 400. However, example process 500 is not limited to implementations using elements of systems 100 or 400 as shown in FIG. 1 or 4.

Beginning at process 5.1 (Clone VM), logic and/or features of host node 101 such as VMM 112 may clone VM 120 to create VM 120-C as a separate instance of VM 120. VM 120-C may be arranged to at least temporarily rune containers 122 and 124 concurrently with VM 120 running these containers.

Moving to process 5.2 (Switching Network Connection), logic and/or features of host node 101 such as virtual switch 150 may switch a network connection for container 124 running at VM 120 to cause input/output packets associated with container 124 executing App(s) 125 to be at least temporarily re-routed from VM 120 to VM 120-C.

Moving to process 5.3 (Drop Output Packets), logic and/or features provisioned to VM 120 such as virtual switch 126 may drop output packets generated by App(s) 125 executed by container 124 running at VM 120 following the switch of the network connection to VM 120-C. Since no input/output packets are being routed to or from VM 120 for container 124, in some examples, container 124 may be deemed a zombie container while in this type of operating state at VM 120.

Moving to process 5.4 (Drop Output Packets), logic and/or features provisioned to VM 120-C such as virtual switch 126-C may drop output packets generated by App(s) 123 executed by container 122 running at VM 120-C. Since no input/output packets are being routed to VM 120-C for container 122, in some examples, container 122 may also be deemed a zombie container while in this type of operating state at VM 120-C.

Moving to process 5.5 (Stop Zombie Container), logic and/or features provisioned to VM 120 such as container manager 128 may stop all execution threads for App(s) 125 executed by zombie container 124. This may effectively stop zombie container 124 from running at VM 120.

Moving to process 5.6 (Recycle/Remove Container Allocated Memory), logic and/or features of host node 101 such as VM 112 may then recycle or remove memory that was allocated to containers 124 running at VM 120.

Moving to process 5.7 (Stop Zombie Container), logic and/or features provisioned to VM 120-C such as container manager 128-C may stop all execution threads for App(s) 123 executed by zombie container 122. This may effectively stop zombie container 122 from running at VM 120-C.

Moving to process 5.8 (Recycle/Remove Container Allocated Memory), logic and/or features of host node 101 such as VM 112 may then recycle or remove memory that was allocated to containers 122 running at VM 120-C.

Moving to process 5.9 (Initiate VM Migration), logic and/or features of host node 101 such as migration manager 412 may initiate a VM migration of VM 120-C to destination host node 401. In some example migration manager 412 may initiate the VM migration with migration manager 413 at host destination node 401.

Moving to process 5.10 (VM Migration), migration manager 412 in collaboration with migration manager 413 may cause memory pages allocated to VM 120-C for running container 124 and executing App(s) 125 as well as operating states to be migrated over network 140 to destination host node 401. In some examples, the migration of VM 120-C may be a live VM migration that may result in a brief shutdown of the execution of App(s) 125 as operating state information of VM 120-C and container 124 are migrated to destination host node 401 for resumption of the execution of App(s) 125 at destination host node 401.

Moving to process 5.11 (Recycle/Remove Container & VM Allocated Memory & Other Resources), logic and/or features of host node 101 such as VM 112 may then recycle or remove memory allocated to containers 122 running at VM 120-C. VM 112 may also recycle or remove memory allocated to VM 120-C as well as other provisioned resources allocated to support VM 120-C at host node 101. The process then comes to an end.

Figure 6:
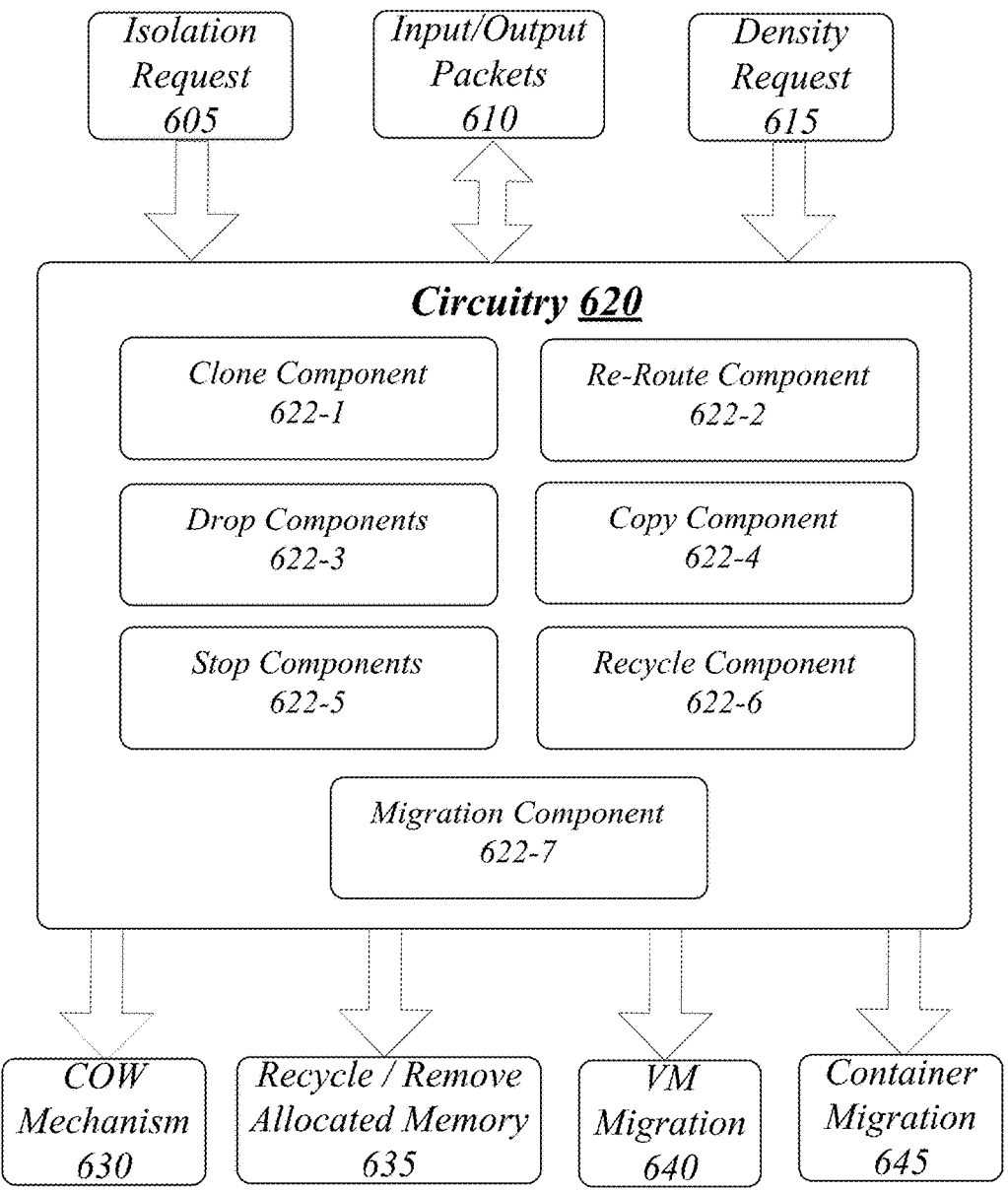
FIG. 6 illustrates an example block diagram for an apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620 maintained at a host node/server arranged or provisioned to host a plurality of VMs. Circuitry 620 may be arranged to execute one or more software or firmware implemented modules or components 622-*a*. It is worthy to note that "a" and "b" and "c" and similar designators as used herein are intended to be variables representing any positive integer. Thus, for example, if an implementation sets a value for a=7, then a complete set of software or firmware for components 622-*a* may include components 622-1, 622-2, 622-3, 622-4, 622-5, 622-6 or 622-7. The examples presented are not limited in this context and the different variables used throughout may represent the same or different integer values. Also, at least some of these "components" may be software/firmware stored in computer-readable media, and although the components are shown in FIG. 6 as discrete boxes, this does not limit these components to storage in distinct computer-readable media components (e.g., a separate memory, etc.).

According to some examples, circuitry 620 may include a processor or processor circuitry to implement logic and/or features that may include one or more components arranged to facilitate cloning of a VM running sets of containers or migration of VMs/containers within or between host nodes/servers. As mentioned above, circuitry 620 may be part of circuitry at a host node/server (e.g., host node 101) that may include processing cores or elements. The circuitry including one or more processing cores can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some components 622-*a* may be implemented as hardware elements of the ASIC.

According to some examples, apparatus 600 may part of a node configured to host a first VM arranged to run at least one set of containers that includes a first container and a second container that are separately capable of executing respective first and second applications. For these examples, apparatus 600 may include a clone component 622-1. Clone component 622-1 may be executed by circuitry 620 to clone the first VM to result in a second VM arranged to at least temporarily run the first and second containers concurrent with the first and second containers arranged to run at the first VM. The cloning of the first VM may be responsive to an isolation request received via isolation request 605.

In some examples, apparatus 600 may also include a re-route component 622-2. Re-route component 622-2 may be executed by circuitry 620 to switch a network connection for the second container arranged to run at the first VM to cause input/output packets associated with the second container capable of executing the second application to be re-routed from the first VM to the second VM. For these examples, the input/output packets may be included in input/output packets 610. These input/output packets may include input request packets and resulting output response packets generated by the second application.

According to some examples, apparatus 600 may also include drop components 622-3. Drop components 622-3 may be executed by circuitry 620 and may include a first drop component to drop output packets generated by the second application executed by the second container arranged to run at the first VM following the switch of the network connection. Drop components 622-3 may also include a second drop component for execution by the circuitry to drop output packets generated by the first application executed by the first container arranged to run at the second VM.

In some examples, apparatus 600 may also include copy component 622-4. Copy component 622-4 may be executed by circuitry 620 to implement a COW mechanism to cause the second VM to use different allocated memory for running the second container responsive to the second application executed by the second container writing to one or more cloned memory pages. The COW mechanism may also cause the first VM to use different allocated memory for running the first container responsive to the first application executed by the first container writing to the one or more clone memory pages. For these examples, the COW mechanism may be similar to COW scheme 200 and may be included in COW mechanism 630.

According to some examples, apparatus 600 may also include stop components 622-5. Stop components 622-5 may be executed by circuitry 620 and may include a first stop component to stop the first container from running at the second VM and a second stop component for execution by the circuitry to stop the second container from running at the first VM. For these examples, stopping the first and second containers may include stopping all execution threads for applications being executed by these containers.

In some examples, apparatus 600 may also include recycle component 622-6. Recycle component 622-6 may be executed by circuitry 620 to recycle or remove allocated memory that was allocated for running the first and second containers at the second and first VMs, respectively. For these examples, the recycled or removed allocated memory may be included in recycle/remove allocated memory 635. This freeing up of resources may be responsive to a workload balance request that may have been included in density request 615.

According to examples, apparatus 600 may also include migration component 622-7. Migration component 622-7 may be executed by circuitry 620 to cause the second VM to be migrated to a destination node. For these examples, the migration of the second VM to the destination node may be a live migration and information for that live migration to the destination node may be included in VM migration 640. Also, in some examples, migration component 622-7 may be capable of causing an isolated container to be migrated back to an original VM that hosted the container. For these examples, migration component 622-7 may cause the second container to be migrated from the second VM to the first VM responsive to a change in an operating characteristic for the node that may be included in a density request such as density request 615. The container migration may be a live migration and may be initiated by container migration 645. Density request 615, in addition to having migration component 622-7 cause the container migration of the second container, may also cause clone component 622-1 to have the first and second containers arranged to be run by only the first VM for the container migration.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by at least clone component 622-1, re-route component 622-2 or drop components 622-3.

According to some examples, logic flow 700 at block 702 may clone, by circuitry at a node, a first VM arranged to run at least one set of containers that includes a first container and a second container that are separately capable of executing respective first and second applications, cloning to result in a second VM arranged to at least temporarily run the first and second containers concurrently with the first and second containers running at the first VM. For these examples, clone component 622-1 may clone the first VM.

In some examples, logic flow 700 at block 704 may switch a network connection for the second container running at the first VM to cause input/output packets associated with the second container executing the second application to be re-routed from the first VM to the second VM. For these examples, re-route component 622-2 may cause the network connection to be switched.

According to some examples, logic flow 700 at block 706 may drop output packets generated by the second application executed by the second container running at the first VM following switching of the network connection. For these examples, a first drop component at the first VM included in drop components 622-3 may cause the output packets to be dropped.

In some examples, logic flow 700 at block 706 may drop output packets generated by the first application executed by the first container running at the second VM. For these examples, a second drop component at the second VM included in drop components 622-3 may cause the output packets to be dropped.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
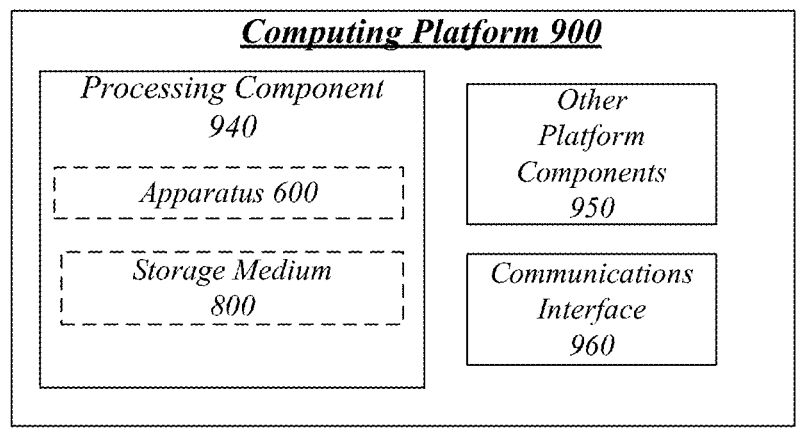
FIG. 9 illustrates an example computing platform.

FIG. 9 illustrates an example computing platform 900. In some examples, as shown in FIG. 9, computing platform 900 may include a processing component 940, other platform components 950 or a communications interface 960. According to some examples, computing platform 900 may be implemented in a node/server. The node/server may be capable of coupling through a network to other nodes/servers and may be part of data center including a plurality of network connected nodes/servers arranged to host VMs arranged to run containers separately capable of executing one or more applications.

According to some examples, processing component 940 may execute processing operations or logic for apparatus 600 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 900 may be implemented in a server/node in a data center. Accordingly, functions and/or specific configurations of computing platform 900 described herein, may be included or omitted in various embodiments of computing platform 900, as suitably desired for a server/node.

The components and features of computing platform 900 may be implemented using any combination of discrete circuitry, application specific integrated circuits (ASICs), logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry at a node configured to host a first VM arranged to run at least one set of containers that includes a first container and a second container that are separately capable of executing respective first and second applications. The apparatus may also include a clone component for execution by the circuitry to clone the first VM to result in a second VM arranged to at least temporarily run the first and second containers concurrent with the first and second containers arranged to run at the first VM. The apparatus may also include a re-route component for execution by the circuitry to switch a network connection for the second container arranged to run at the first VM to cause input/output packets associated with the second container capable of executing the second application to be re-routed from the first VM to the second VM. The apparatus may also include a first drop component for execution by the circuitry to drop output packets generated by the second application executed by the second container arranged to run at the first VM following the switch of the network connection. The apparatus may also include a second drop component for execution by the circuitry to drop output packets generated by the first application executed by the first container arranged to run at the second VM.

Example 2

The apparatus of example 1 may also include a copy component for execution by the circuitry to implement a COW mechanism to cause the second VM to use different allocated memory for running the second container responsive to the second application executed by the second container writing to one or more cloned memory pages.

Example 3

The apparatus of example 2, the copy component may be included in a virtual machine manager capable of managing the first and second VMs.

Example 4

The apparatus of example 2, the clone component may clone the first VM responsive to a change in an operating characteristic for at least one of the first or second containers to cause the first container to be isolated from the second container.

Example 5

The apparatus of example 4, the change in the operating characteristic may be based on receipt of a request for isolation that results in a requirement to have the first and second applications executed by containers arranged to run on separate VMs.

Example 6

The apparatus of example 1 may also include a first stop component for execution by the circuitry to stop the first container from running at the second VM. The apparatus may also include a second stop component for execution by the circuitry to stop the second container from running at the first VM. The apparatus may also include a recycle component for execution by the circuitry to recycle or remove allocated memory that was allocated for running the first and second containers at the second and first VMs, respectively.

Example 7

The apparatus of example 6 may also include a migration component for execution by the circuitry to cause the second VM to be migrated to a destination node. For these examples, the recycle component may recycle or remove allocated memory that was allocated for running the second container at the second VM following migration of the second VM to the destination node.

Example 8

The apparatus of example 7, the migration component may cause the second VM to be migrated to the destination node responsive to a workload balance request to balance workloads between the node and the destination node.

Example 9

The apparatus of example 6 may also include a migration component for execution by the circuitry to cause the second container arranged to run at the second VM to be migrated from the second VM to the first VM. For these examples, the first drop component may cause output packets generated by both the first and second applications executed by the first and second containers to be dropped while the first and second containers run at the second VM during the migration of the second container from the second VM to the first VM. Also for these examples, the second stop component may stop the first and second containers from running at the second VM following the migration.

Example 10

The apparatus of example 9, the migration component may cause the second container arranged to run at the second VM to be migrated to the first VM responsive to a change in an operating characteristic for the node that causes the clone component to have the first and second containers arranged to be run by only the first VM.

Example 11

The apparatus of example 10, the change in the operating characteristic may be based on receipt by the clone component of a request for increased density of containers arranged to run per VM at the node.

Example 12

The apparatus of example 1 may also include a digital display coupled to the circuitry to present a user interface view.

Example 13

An example method may include cloning, by circuitry at a node, a first VM arranged to run at least one set of containers that includes a first container and a second container that are separately capable of executing respective first and second applications, cloning to result in a second VM arranged to at least temporarily run the first and second containers concurrently with the first and second containers running at the first VM. The method may also include switching a network connection for the second container running at the first VM to cause input/output packets associated with the second container executing the second application to be re-routed from the first VM to the second VM. The method may also include dropping output packets generated by the second application executed by the second container running at the first VM following switching of the network connection. The method may also include dropping output packets generated by the first application executed by the first container running at the second VM.

Example 14

The method of example 13 may also include using a COW mechanism to cause the first VM to use different allocated memory for running the first container responsive to the first application executed by the first container writing to one or more cloned memory pages.

Example 15

The method of example 14 may also include cloning the first VM responsive to a change in an operating characteristic for at least one of the first or second containers to cause the first container to be isolated from the second container.

Example 16

The method of example 15, the change in the operating characteristic may be based on receiving a request for isolation that results in a requirement to have the first and second applications executed by containers running on separate VMs.

Example 17

The method of example 13 may also include stopping the first container running at the second VM. The method may also include stopping the second container running at the first VM. The method may also include recycling memory or removing allocated memory that was allocated for running the first and second containers at the second and first VMs, respectively.

Example 18

The method of example 17 may also include causing the second VM to be migrated to a destination node. The method may also include recycling memory or removing allocated memory that was allocated for running the second container at the second VM following migration of the second VM to the destination node.

Example 19

The method of example 18, migrating the second VM to the destination node may be responsive to a workload balance request to balance workloads between the node and the destination node.

Example 20

The method of example 17 may also include migrating the second container running at the second VM to the first VM. The method may also include dropping output packets generated by both the first and second applications executed by the first and second containers running at the second VM during migration of the second container from the second VM to the first VM. The method may also include stopping the first and second containers running at the second VM following migration.

Example 21

The method of example 20, migrating may cause the second container running at the second VM to be migrated to the first VM responsive to a change in an operating characteristic for the node that causes the first and second containers to return to being run only by the first VM.

Example 22

The method of example 21, the change in the operating characteristic may be based on receiving a request for increased density of containers running per VM at the node.

Example 23

An example at least one machine readable medium may include a plurality of instructions that in response to being executed by system at a server may cause the system to carry out a method according to any one of examples 13 to 22.

Example 24

An example apparatus may include means for performing the methods of any one of examples 13 to 22.

Example 25

An example at least one machine readable medium may include a plurality of instructions that in response to being executed by a system at a node may cause the system to clone a first VM arranged to run at least one set of containers that includes a first container and a second container that are separately capable of executing respective first and second applications. The cloning may result in a second VM arranged to at least temporarily run the first and second containers concurrent with the first and second containers arranged to run at the first VM. The instructions may also cause the system to switch a network connection for the second container arranged to run at the first VM to cause input/output packets associated with the second container capable of executing the second application to be re-routed from the first VM to the second VM. The instructions may also cause the system to drop output packets generated by the second application executed by the second container arranged to run at the first VM following the switch of the network connection. The instructions may also cause the system to drop output packets generated by the first application executed by the first container arranged to run at the second VM.

Example 26

The at least one machine readable medium of example 25, the instructions may further cause the system to implement a COW mechanism to cause the second VM to use different allocated memory for running the second container responsive to the second application executed by the second container writing to one or more cloned memory pages.

Example 27

The at least one machine readable medium of example 26, the instructions may further cause the system to clone the first VM responsive to a change in an operating characteristic for at least one of the first or second containers to cause the first container to be isolated from the second container.

Example 28

The at least one machine readable medium of example 27, the change in the operating characteristic may be based on receipt of a request for isolation that results in a requirement to have the first and second applications executed by containers arranged to run on separate VMs.

Example 29

The at least one machine readable medium of example 25, the instructions may further cause the system to stop the first container from running at the second VM. The instructions may also cause the system to stop the second container from running at the first VM. The instructions may also cause the system to recycle or remove allocated memory that was allocated for running the first and second containers at the second and first VMs, respectively.

Example 30

The at least one machine readable medium of example 29, the instructions may further cause the system to cause the second VM to be migrated to a destination node. The instructions may also cause the system to recycle or remove allocated memory that was allocated for running the second container at the second VM following migration of the second VM to the destination node.

Example 31

The at least one machine readable medium of example 30, the instructions may further cause the system to cause the second VM to be migrated to the destination node responsive to a workload balance request to balance workloads between the node and the destination node.

Example 32

The at least one machine readable medium of example 29, the instructions may further cause the system to migrate the second container arranged to run at the second VM to the first VM. The instructions may also cause the system to cause output packets generated by both the first and second applications executed by the first and second containers to be dropped while the first and second containers run at the second VM during migration of the second container from the second VM to the first VM. The instructions may also cause the system to stop the first and second containers from running at the second VM following migration.

Example 33

The at least one machine readable medium of example 32, the instructions may cause the system to migrate the second container to the first VM responsive to a change in an operating characteristic for the node that causes the first and second containers to be arranged by the system to be run by only the first VM.

Example 34

The at least one machine readable medium of example 33, the change in the operating characteristic may be based on the instructions to cause the system to increase density of containers arranged to run per VM at the node responsive to receipt of a request for increased density at the node.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine readable medium comprising a plurality of instructions that in response to being executed by a system at a node cause the system to:
clone a first virtual machine (VM) arranged to run at least one set of containers that includes a first container and a second container that are separately capable of executing respective first and second applications, the cloning to result in a second VM arranged to at least temporarily run the first and second containers concurrent with the first and second containers arranged to run at the first VM;
switch a network connection for the second container arranged to run at the first VM to cause input/output packets associated with the second container capable of executing the second application to be re-routed from the first VM to the second VM;
drop output packets generated by the second application executed by the second container arranged to run at the first VM following the switch of the network connection; and
drop output packets generated by the first application executed by the first container arranged to run at the second VM.

2. The at least one machine readable medium of claim 1, the instructions to further cause the system to:
implement a copy-on-write (COW) mechanism to cause the second VM to use different allocated memory for running the second container responsive to the second application executed by the second container writing to one or more cloned memory pages.

3. The at least one machine readable medium of claim 2, the instructions to further cause the system to:
clone the first VM responsive to a change in an operating characteristic for at least one of the first or second containers to cause the first container to be isolated from the second container.

4. The at least one machine readable medium of claim 3, the change in the operating characteristic based on receipt of a request for isolation that results in a requirement to have the first and second applications executed by containers arranged to run on separate VMs.

5. The at least one machine readable medium of claim 1, the instructions to further cause the system to:
stop the first container from running at the second VM;
stop the second container from running at the first VM; and
recycle or remove allocated memory that was allocated for running the first and second containers at the second and first VMs, respectively.

6. The at least one machine readable medium of claim 5, the instructions to further cause the system to:
cause the second VM to be migrated to a destination node; and
recycle or remove allocated memory that was allocated for running the second container at the second VM following migration of the second VM to the destination node.

7. The at least one machine readable medium of claim 6, the instructions to further cause the system to:
cause the second VM to be migrated to the destination node responsive to a workload balance request to balance workloads between the node and the destination node.

8. The at least one machine readable medium of claim 5, the instructions to further cause the system to:
switch the network connection for the second container arranged to run at second VM to cause input/output packets associated with the second container capable of executing the second application to be re-routed from the second VM to the first VM;

cause output packets generated by both the first and second applications executed by the first and second containers to be dropped while the first and second containers run at the second VM following the switch of the network connection from the second VM to the first VM; and stop the first and second containers from running at the second VM.

9. The at least one machine readable medium of claim 8, the instructions to cause the system to switch the network connection from the second VM to the first VM responsive to a change in an operating characteristic for the node that causes the first and second containers to be arranged by the system to be run by only the first VM.

10. The at least one machine readable medium of claim 9, the change in the operating characteristic based on the instructions to cause the system to increase density of containers arranged to run per VM at the node responsive to receipt of a request for increased density at the node.

11. An apparatus comprising:
circuitry at a node configured to host a first virtual machine (VM) arranged to run at least one set of containers that includes a first container and a second container that are separately capable of executing respective first and second applications;
a clone component for execution by the circuitry to clone the first VM to result in a second VM arranged to at least temporarily run the first and second containers concurrent with the first and second containers arranged to run at the first VM;
a re-route component for execution by the circuitry to switch a network connection for the second container arranged to run at the first VM to cause input/output packets associated with the second container capable of executing the second application to be re-routed from the first VM to the second VM;
a first drop component for execution by the circuitry to drop output packets generated by the second application executed by the second container arranged to run at the first VM following the switch of the network connection; and
a second drop component for execution by the circuitry to drop output packets generated by the first application executed by the first container arranged to run at the second VM.

12. The apparatus of claim 11, comprising:
a copy component for execution by the circuitry to implement a copy-on-write (COW) mechanism to cause the second VM to use different allocated memory for running the second container responsive to the second application executed by the second container writing to one or more cloned memory pages.

13. The apparatus of claim 12, the copy component included in a virtual machine manager capable of managing the first and second VMs.

14. The apparatus of claim 12, the clone component to clone the first VM responsive to a change in an operating characteristic for at least one of the first or second containers to cause the first container to be isolated from the second container.

15. The apparatus of claim 14, the change in the operating characteristic based on receipt of a request for isolation that results in a requirement to have the first and second applications executed by containers arranged to run on separate VMs.

16. The apparatus of claim 11, comprising:
a first stop component for execution by the circuitry to stop the first container from running at the second VM;
a second stop component for execution by the circuitry to stop the second container from running at the first VM; and
a recycle component for execution by the circuitry to recycle or remove allocated memory that was allocated for running the first and second containers at the second and first VMs, respectively.

17. The apparatus of claim 16, comprising:
a migration component for execution by the circuitry to cause the second container arranged to run at the second VM to be migrated from the second VM to the first VM;
the first drop component to cause output packets generated by both the first and second applications executed by the first and second containers to be dropped while the first and second containers run at the second VM during the migration of the second container from the second VM to the first VM; and
the second stop component to stop the first and second containers from running at the second VM following the migration.

18. The apparatus of claim 17, the migration component to cause the second container arranged to run at the second VM to be migrated to the first VM responsive to a change in an operating characteristic for the node that causes the clone component to have the first and second containers arranged to be run by only the first VM.

19. The apparatus of claim 11, comprising a digital display coupled to the circuitry to present a user interface view.

20. A method comprising:
cloning, by circuitry at a node, a first virtual machine (VM) arranged to run at least one set of containers that includes a first container and a second container that are separately capable of executing respective first and second applications, the cloning to result in a second VM arranged to at least temporarily run the first and second containers concurrently with the first and second containers running at the first VM;
switching a network connection for the second container running at the first VM to cause input/output packets associated with the second container executing the second application to be re-routed from the first VM to the second VM;
dropping output packets generated by the second application executed by the second container running at the first VM following switching of the network connection; and
dropping output packets generated by the first application executed by the first container running at the second VM.

21. The method of claim 20, comprising:
using a copy-on-write (COW) mechanism to cause the first VM to use different allocated memory for running the first container responsive to the first application executed by the first container writing to one or more cloned memory pages.

22. The method of claim 20, comprising:
stopping the first container running at the second VM;
stopping the second container running at the first VM; and
recycling memory or removing allocated memory that was allocated for running the first and second containers at the second and first VMs, respectively.

23. The method of claim 22, comprising:
causing the second VM to be migrated to a destination node; and
recycling memory or removing allocated memory that was allocated for running the second container at the second VM following migration of the second VM to the destination node.

24. The method of claim 23, migrating the second VM to the destination node responsive to a workload balance request to balance workloads between the node and the destination node.

25. The method of claim 22, comprising:
switching the network connection for the second container running at second VM to cause input/output packets associated with the second container executing the second application to be re-routed from the second VM to the first VM;
dropping output packets generated by both the first and second applications executed by the first and second containers running at the second VM following switching of the network connection from the second VM to the first VM; and
stopping the first and second containers running at the second VM.

* * * * *